United States Patent
Ishibashi et al.

(10) Patent No.: US 6,494,375 B1
(45) Date of Patent: Dec. 17, 2002

(54) INFORMATION-CODE-IMAGE CAPTURING APPARATUS

(75) Inventors: Toshiharu Ishibashi, Kariya (JP); Kenzo Obata, Okazaki (JP); Toshio Morimoto, Oobu (JP); Hirotoshi Nakamura, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/549,953

(22) Filed: Apr. 14, 2000

(30) Foreign Application Priority Data

May 26, 1999 (JP) .......................... 11-146651
Aug. 26, 1999 (JP) .......................... 11-239703

(51) Int. Cl.$^7$ .............................. G06K 7/10
(52) U.S. Cl. ...................... 235/462.11; 235/462.17; 235/462.31
(58) Field of Search ................ 235/462.11, 462.09, 235/462.1, 462.14, 462.17, 462.24, 462.31, 479, 454

(56) References Cited

U.S. PATENT DOCUMENTS

| | | | |
|---|---|---|---|
| 4,874,936 A | * 10/1989 | Chandler et al. | 235/494 |
| 5,426,288 A | * 6/1995 | Obata et al. | 235/455 |
| 5,679,941 A | * 10/1997 | Iizaka et al. | 235/383 |
| 5,698,833 A | 12/1997 | Skinger | |
| 5,754,670 A | 5/1998 | Shin et al. | |
| 6,267,296 B1 | * 7/2001 | Ooshima et al. | 235/487 |
| 6,325,289 B1 | * 12/2001 | Mazzone | 235/462.14 |

FOREIGN PATENT DOCUMENTS

| | | |
|---|---|---|
| JP | 53-69538 | 6/1978 |
| JP | 61-133486 | 6/1986 |
| JP | 9-6891 | 1/1997 |

* cited by examiner

Primary Examiner—Michael G. Lee
Assistant Examiner—Daniel St. Cyr
(74) Attorney, Agent, or Firm—Law Offices of David G. Posz

(57) ABSTRACT

An information-code-image capturing apparatus operates for emitting light toward an article moving along a carry path, and receiving reflected light and capturing an image of an information code on the article. The information-code-image capturing apparatus includes a detecting device for detecting that the article reaches a predetermined position in the carry path. An image capturing device operates for capturing the image on the basis of the reflected light when a time interval has elapsed since a moment at which the detecting device detects that the article reaches the predetermined position. A positional information calculating device n operates for calculating positional information on the basis of the image captured by the image capturing device. The positional information enables an area of the information code to be determined in the captured image. A capture timing correcting device operates for correcting the time interval on the basis of the positional information calculated by the positional information calculating device.

9 Claims, 7 Drawing Sheets

FIELD OF VIEW OF CCD AREA SENSOR

POINT OF INTERSECTION BETWEEN DIAGONAL LINES

INFORMATION-CODE-IMAGE CAPTURING APPARATUS

BACKGROUND OF THE INVENTION

1. Field of the Invention

This invention relates to an information-code-image capturing apparatus. Also, this invention relates to an optical information reading apparatus. In addition, this invention relates to a system for setting an image input timing or an image capture timing.

2. Description of the Related Art

In general, an information-representing code such as a bar code or a two-dimensional code is provided on the surface of an article. A conventional apparatus for optically reading an information-representing code includes a light emitter, a CCD sensor, and a signal processor. The light emitter includes, for example, an LED. The light emitter applies forward reading light to the target surface of an article on which an information-representing code is provided. The CCD sensor includes, for example, an array of photosensors. The CCD sensor receives return light which results from reflection of the forward reading light at the target surface of the article. The return light represents an image of the information-representing code. The CCD sensor converts the return light into an electric signal representing the image of the information-representing code. In this way, an image of the information-representing code is captured or inputted. The signal processor decodes the electric signal to recover the information represented by the code.

There is a known apparatus for optically reading information-representing codes which are moving, for example, information-representing codes provided on articles which are being carried by a belt conveyor. The known apparatus includes a light emitter and a CCD sensor. The light emitter outputs forward reading light at a timing when an information-representing code on an article comes into the view of the CCD sensor.

Japanese published unexamined patent application 53-69538 discloses a system in which objects to be inspected are successively carried by a belt conveyor. In the system of Japanese application 53-69538, a position sensor detects whether or not an object comes into the view of a fixed television camera. When the position sensor detects that an object comes into the view of the television camera, a strobe device applies a flash of light to the object. Thus, the television camera outputs an electric signal representing a still image of the object which is substantially independent of the speed of movement of the object. The pattern of the object is recognized by referring to the still image of the object which is represented by the output signal of the television camera. In the system of Japanese application 53-69538, parallel mark lines are provided on the surface of the belt of the conveyor. The mark lines are covered by objects, and are exposed in the regions between the objects. Thus, the mark lines are separated into spaced segments as viewed from the television camera. In the processing of the output signal of the television camera, ends of segments of the mark lines are used as indications of starting edges of the patterns of the objects.

Japanese published unexamined patent application 61-133486 discloses a system in which objects having bar codes are successively carried by a belt conveyor. In the system of Japanese application 61-133486, a position sensor detects whether or not a bar code on an object comes into the view of a fixed camera. When the position sensor detects that a bar code on an object comes into the view of the camera, a strobe device applies a flash of light to the bar code. Thus, the camera outputs an electric signal representing a substantially still image of the bar code on the object. The output signal of the camera is decoded to recover the information represented by the bar code.

U.S. Pat. No. 5,698,833 discloses a method of determining the location and approximate orientation of a bar code on a substrate. The method in U.S. Pat. No. 5,698,833 is implemented by an omnidirectional bar-code locator. A digit image is a one-bit representation of a standard eight-bit grey scale video image produced by a CCD camera. The omnidirectional bar-code locator processes, in real-time, a digital video signal defining a pixelized image of a conveyor carrying parcels through the field of the view of the CCD camera. The omnidirectional bar-code locator divides the video image into a plurality of cells and produces two output signals, a cell bar-code indication signal and a cell bar-code orientation signal, for each cell. A host computer responds to a "true" cell bar-code indication signal for a cell by storing the portion of the video image corresponding to the cell in a mass storage memory. The host computer also stores a representation of the cell bar-code orientation signal for each cell in which the cell bar-code indication signal is "true". The omnidirectional bar-code locator thus allows the host computer to store only those cells of the video image that contain bar-code data. The bar-code data may then be provided to a bar-code reader for further processing.

U.S. Pat. No. 5,698,833 also discloses that a belt encoder provides a signal indicating the linear displacement of a conveyor. The CCD camera is cycled in response to the signal from the belt encoder to generate a series of analog line images that are transmitted to a digitizer. The belt encoder triggers the CCD camera at a specified rate so that the resolution of the image created by the CCD camera is equal to a given number of pixels in the direction of the travel of the conveyor.

U.S. Pat. No. 5,754,670 corresponding to Japanese published unexamined patent application 9-6891 discloses a data symbol reader of a fixed type which includes a CCD camera. In the data symbol reader of U.S. Pat. No. 5,754,670, when a reading process is executed, a frame image capture is carried out by the CCD camera. Calculation is given of the number of pixels provided by the CCD camera which corresponds to the displacement or the difference between a first-field image and a second-field image. The speed of movement of a data symbol is computed on the basis of the calculated pixel number. An optimal light exposure time is calculated from the computed speed of movement of the data symbol. Then, an optimal intensity of illumination is calculated from the optimal light exposure time. Reading the data symbol is carried out under conditions using the optimal light exposure time and the optimal illumination intensity. In the data symbol reader of U.S. Pat. No. 5,754,670, the light exposure is optimally controlled in accordance with the speed of movement of the data symbol.

SUMMARY OF THE INVENTION

It is a first object of this invention to provide an improved information-code-image capturing apparatus.

It is a second object of this invention to provide an improved optical information reading apparatus.

It is a third object of this invention to provide an improved system for setting an image input timing or an image capture timing.

A first aspect of this invention provides an information-code-image capturing apparatus for emitting light toward an article moving along a carry path, and receiving reflected light and capturing an image of an information code on the article. The apparatus comprises detecting means for detecting that the article reaches a predetermined position in the carry path; image capturing means for capturing the image on the basis of the reflected light when a time interval has elapsed since a moment at which the detecting means detects that the article reaches the predetermined position; positional information calculating means for calculating positional information on the basis of the image captured by the image capturing means, the positional information enabling an area of the information code to be determined in the captured image; and capture timing correcting means for correcting the time interval on the basis of the positional information calculated by the positional information calculating means.

A second aspect of this invention is based on the first aspect thereof, and provides an information-code-image capturing apparatus wherein the positional information calculating means comprises means for calculating the positional information on the basis of a positioning symbol in the information code.

A third aspect of this invention is based on the second aspect thereof, and provides an information-code-image capturing apparatus wherein the positional information calculating means comprises means for calculating a position of a center of the information code as the positional information on the basis of the positioning symbol in the information code.

A fourth aspect of this invention is based on the second aspect thereof, and provides an information-code-image capturing apparatus wherein the information code comprises a QR code, and the positional information calculating means comprises means for calculating a position of a center of a positioning symbol in the QR code as the positional information.

A fifth aspect of this invention is based on the first aspect thereof, and provides an information-code-image capturing apparatus wherein the time interval comprises a plurality of different sub time intervals; the image capturing means comprises means for capturing an image when each of the sub time intervals has elapsed since the moment at which the detecting means detects that the article reaches the predetermined position; the positional information calculating means comprises means for calculating positional information for each of the images captured by the image capturing means; and the capture timing correcting means comprises means for correcting each of the sub time intervals on the basis of the positional information calculated by the positional information calculating means.

A sixth aspect of this invention is based on the fifth aspect thereof, and provides an information-code-image capturing apparatus wherein the capture timing correcting means comprises means for detecting a direction of carry of the article on the basis of the calculated positional information for each of the captured images, and means for correcting each of the sub time intervals in response to the detected direction of carry of the article.

A seventh aspect of this invention provides an optical information reading apparatus comprising an information-code-image capturing apparatus including the information-code-image capturing apparatus in one of the first to sixth aspects of this invention; and decoding means for executing a decoding process with respect to the information code in the image captured by the information-code-image capturing apparatus to read information represented by the information code.

An eighth aspect of this invention provides a system for setting an image capture timing. The system comprises an optical information reading apparatus for emitting light toward an article moving along a carry path, and receiving reflected light and capturing an image of an information code on the article; and an information processing apparatus being separate from the optical information reading apparatus and being able to implement data communications with the optical information reading apparatus;

wherein the optical information reading apparatus comprises 1) detecting means for detecting that the article reaches a predetermined position in the carry path; 2) image capturing means for capturing the image on the basis of the reflected light when a time interval has elapsed since a moment at which the detecting means detects that the article reaches the predetermined position; 3) transmitting means for transmitting the image captured by the image capturing means to the information processing apparatus; and 4) capture timing correcting means for receiving a correcting command from the information processing apparatus, and for correcting the time interval in response to the correcting command; and wherein the information processing apparatus comprises 1) positional information calculating means for calculating positional information on the basis of the image transmitted from the optical information reading apparatus; and 2) command generating means for generating the correcting command on the basis of the positional information calculated by the positional information calculating means, and for transmitting the correcting command to the optical information reading apparatus.

A ninth aspect of this invention provides an adaptive apparatus for capturing at least portions of images of successively carried articles having information-representing codes at equal positions of the articles. The apparatus comprises first means for detecting whether or not an article reaches a predetermined position; a fixed image sensor; second means for capturing at least a portion of an image of the article via the image sensor when a variable time interval has elapsed since a moment at which the first means detects that the article reaches the predetermined position; third means for detecting a position of an information-representing code in the image captured by the second means; and fourth means for varying the time interval in response to the position detected by the third means.

DESCRIPTION OF THE PREFERRED EMBODIMENTS

First Embodiment

Figure 1:
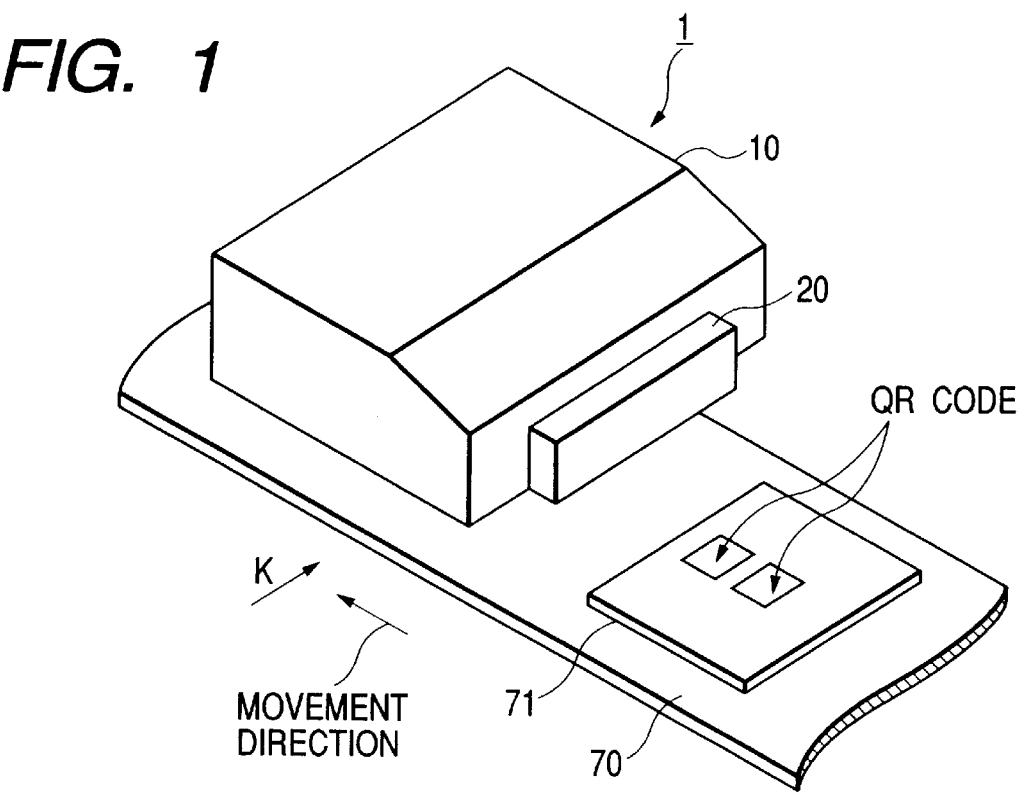
FIG. 1 is a perspective view of a belt conveyor, an article, and a two-dimensional-code reading apparatus according to a first embodiment of this invention.
Figure 2:
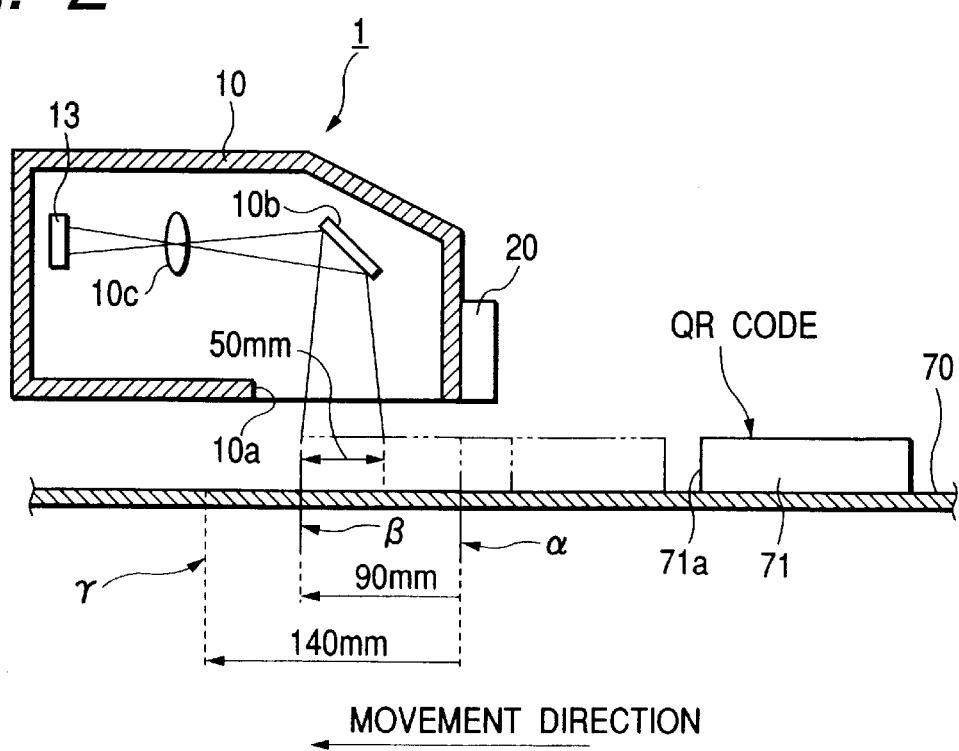
FIG. 2 is a sectional view of the belt conveyor, the article, and the two-dimensional-code reading apparatus in FIG. 1 as viewed in the direction denoted by "K" in FIG. 1.

With reference to FIGS. 1 and 2, a two-dimensional-code reading apparatus 1 in a first embodiment of this invention is of a fixed type. A belt conveyor 70 carries articles 71, only one of which is shown in FIG. 1. The articles 71 on the belt conveyor 70 are spaced from each other along the direction of travel of the belt conveyor 70. QR (quick response) codes are printed on the upper surfaces of the articles 71. The apparatus 1 operates to read the QR codes on the articles 71. The apparatus 1 is fixed to a pole (not shown) extending at a side of the belt conveyor 70. A main portion of the apparatus 1 is located above the belt conveyor 70.

The two-dimensional-code reading apparatus 1 includes an optical information reading unit 10 and an article detection unit 20 which are fixed to each other and are combined into a single body. The article detection unit 20 is upstream of the optical information reading unit 10 with respect to the direction of travel of the belt conveyor 70.

The article detection unit 20 emits forward light in a downward direction. The article detection unit 20 has the function of detecting return light which results from reflection of the forward light. The article detection unit 20 outputs a signal to the optical information reading unit 10 which represents whether or not return light is detected. Preferably, the upper surfaces of the belt conveyor 70 have a predetermined color different from a color of the upper surfaces of the articles 71. The tone of the upper surfaces of the belt conveyor 70 may be different from that of the upper surfaces of the articles 71. The colors or the tones of the upper surfaces of the belt conveyor 70 and the articles 71 are designed to provide the following processes. The forward light emitted from the article detection unit 20 is absorbed by the upper surfaces of the belt conveyor 70 while being hardly reflected thereat. Thus, sensible return light does not occur when the forward light meets the upper surfaces of the belt conveyor 70. On the other hand, the forward light is efficiently reflected at the upper surfaces of the articles 71. Thus, sensible return light occurs when the forward light meets the upper surfaces of the articles 71. Specifically, when each article 71 on the belt conveyor 70 reaches a predetermined position relative to the article detection unit 20, return light appears which is sensed by the article detection unit 20. In more detail, when the front end surface 71a of each article 71 reaches a predetermined position "α" (see FIG. 2), return light appears which is sensed by the article detection unit 20.

Figure 3:
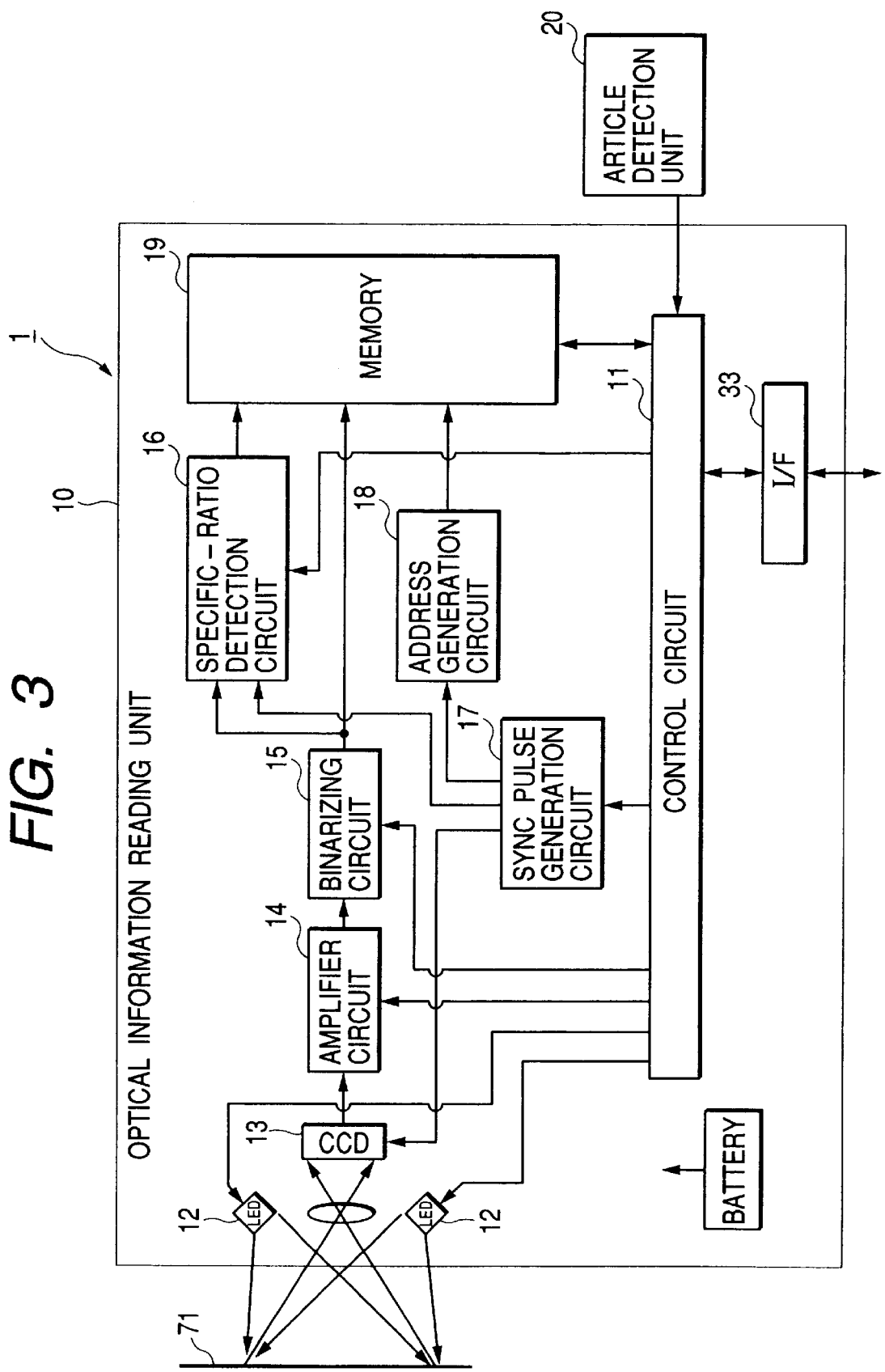
FIG. 3 is a block diagram of the two-dimensional-code reading apparatus in FIGS. 1 and 2.

As shown in FIG. 3, the optical information reading unit 10 includes a control circuit 11, light emitting diodes 12 for illumination, a CCD area sensor (a CCD image sensor) 13, an amplifier circuit 14, a binarizing circuit 15, a specific-ratio detection circuit 16, a sync pulse generation circuit 17, an address generation circuit 18, a memory 19, and a communication interface (I/F) circuit 33. The light emitting diodes 12 are also referred to as the illumination LED's 12.

The control circuit 11 is connected to the illumination LED's 12, the amplifier circuit 14, the binarizing circuit 15, the specific-ratio detection circuit 16, the sync pulse generation circuit 17, the memory 19, the article detection unit 20, and the communication I/F circuit 33. The CCD area sensor 13 is connected to the amplifier circuit 14 and the sync pulse generation circuit 17. The amplifier circuit 14 is connected to the binarizing circuit 15. The binarizing circuit 15 is connected to the specific-ratio detection circuit 16 and the memory 19. The specific-ratio detection circuit 16 is connected to the sync pulse generation circuit 17 and the memory 19. The sync pulse generation circuit 17 is connected to the address generation circuit 18. The address generation circuit 18 is connected to the memory 19.

The control circuit 11 includes a computer having a combination of a CPU, a ROM, a RAM, and an I/O port. The control circuit 11 operates in accordance with a program stored in the ROM. The program may be stored in the RAM. The device 11 controls the illumination LED's 12, the amplifier circuit 14, the binarizing circuit 15, the specific-ratio detection circuit 16, the sync pulse generation circuit 17, the memory 19, and the communication I/F circuit 33.

The illumination LED's 12 apply red illumination light (forward reading light) to a region containing a QR code on the upper surface of an article 71. The illumination light is reflected at the region, causing return light. The CCD area sensor 13 includes a two-dimensional photodiode array, and a CCD array connected to the photodiode array. The CCD area sensor 13 receives return light from the region containing the QR code, and converts the received light into an electric signal representing a two-dimensional 1-frame image of that region. The electric signal is of a predetermined line-by-line scanning format. The scanning process implemented by the CCD area sensor 13 is controlled by a sync signal fed from the sync pulse generation circuit 17. The CCD area sensor 13 outputs the electric signal to the amplifier circuit 14.

The device 14 amplifies the output signal of the CCD area sensor 13 at a gain determined by a control voltage fed from the control circuit 11. The amplifier circuit 14 outputs the amplification-resultant signal to the binarizing circuit 15.

The binarizing circuit 15 converts the output signal of the amplifier circuit 14 into a binary signal or a two-value signal in response to a threshold voltage determined by a control signal fed from the control circuit 11. The binarizing circuit 15 outputs the binary signal to the specific-ratio detection circuit 16 and the memory 19. The binary signal is stored into the memory 19 as digital two-value data (digital image data) representing the 1-frame image of the region containing the QR code. The specific-ratio detection circuit 16 implements detection of a specific frequency ratio from the output signal of the binarizing circuit 15. The specific-radio detection circuit 16 generates a signal representing a result of the detection. The specific-radio detection circuit 16 outputs the detection-result signal to the memory 19.

The CCD area sensor 13 implements image detection or image capture at a timing determined by a control signal fed from the control circuit 11. Each time the image detection (the image capture) is executed by the CCD area sensor 13, the generated digital image data are stored into the memory 19.

Preferably, digital image data are stored into the memory 19 after the detection of the specific frequency ratio is implemented by the specific-ratio detection circuit 16. Alternatively, digital image data may be stored into the memory 19 before detection of a specific pattern such as a specific frequency ratio is implemented in response to the digital image data.

The sync pulse generation circuit 17 produces a sync pulse signal having a frequency sufficiently higher than a maximum frequency of the output signal of the CCD area sensor 13. The sync pulse generation circuit 17 outputs the sync signal to the CCD area sensor 13, the specific-ratio detection circuit 16, and the address generation circuit 18. The address generation circuit 18 counts pulses in the sync signal, and generates an address signal in response to the count result. The address generation circuit 18 outputs the address signal to the memory 19. The writing of the digital image data into the memory 19 is implemented 16 bits by 16 bits. Specifically, 16-bit pieces of the digital image data are sequentially written into different storage segments in the memory 19 in response to the address signal.

It should be noted that the writing of the digital image data into the memory 19 may be implemented 8 bits by 8 bits.

The specific-ratio detection circuit 16 includes state change detectors which sense every state change from "1" to "0" and every state change from "0" to "1" in the output signal of the binarizing circuit 15. The specific-radio detection circuit 16 includes a first counter which counts pulses in the sync signal during every time interval between the moment of the occurrence of a state change from "0" to "1" and the moment of the occurrence of a following state change from "1" to "0". The result of the pulse count by the first counter indicates, for example, the length of a continuous bright portion (a continuous white portion) in the image represented by the output signal of the binarizing circuit 15. The specific-radio detection circuit 16 includes a second counter which counts pulses in the sync signal during every time interval between the moment of the occurrence of a state change from "1" to "0" and the moment of the occurrence of a following state change from "0" to "1". The result of the pulse count by the second counter indicates, for example, the length of a continuous dark portion (a continuous black portion) in the image represented by the output signal of the binarizing circuit 15. The specific-ratio detection circuit 16 includes a divider or a calculator which computes the ratio in length between the continuous bright portion and the continuous dark portion in response to an output signal of the first counter and an output signal of the second counter. The calculator generates and outputs a signal representing the ratio in length between the continuous bright portion and the continuous dark portion. The specified-ratio detection circuit 16 includes a comparator which determines whether ratios sequentially represented by the output signal of the calculator are equal to or different from a reference ratio sequence corresponding to a specific pattern in a QR code. The reference ratio sequence is represented by a signal fed from, for example, the control circuit 11. The comparator outputs a digital signal representing the result of the determination. The output signal of the comparator is referred to as digital ratio detection data. The specific-ratio detection circuit 16 outputs the digital ratio detection data to the memory 19. Pieces of the digital ratio detection data are sequentially written into different storage segments in the memory 19 in response to the address signal.

The communication I/F circuit 33 implements communication with an external apparatus (not shown). Specifically, the communication I/F circuit 33 transmits data to the external apparatus. Furthermore, the communication I/F circuit 33 receives signals from the external apparatus.

Figure 4:
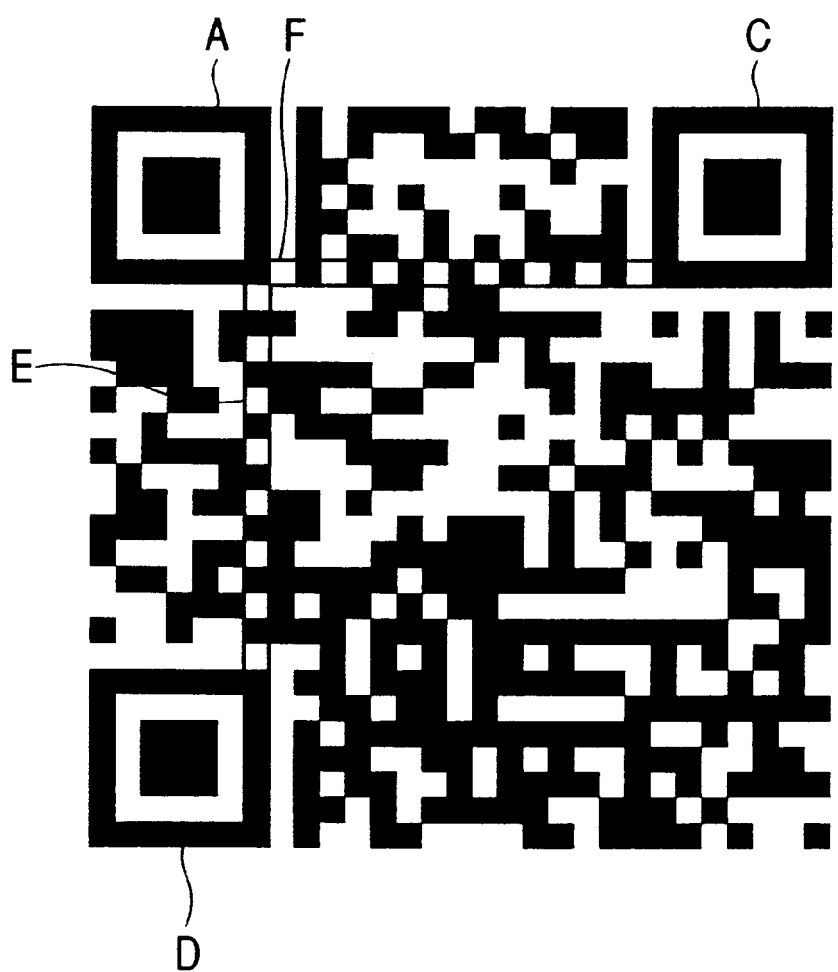
FIG. 4 is a plan view of an example of a QR code.

FIG. 4 shows an example of a state of a QR code which is one type of a two-dimensional code. As shown in FIG. 4, the QR code extends over a square or rectangular area. The QR code has three positioning symbols "A", "C", and "D" at corners of the whole code area. A first step in a QR-code reading process detects the positioning symbols "A", "C", and "D".

Each of positioning symbols "A", "C", and "D" in a QR code has bright and dark portions (that is, white and black portions). The ratio in length among the bright and dark portions is equal to a predetermined ratio as "1 (dark): 1 (bright): 3 (dark): 1 (bright): 1 (dark)" independent of the scanning direction. The ratio in length among the bright and dark portions which is equal to the predetermined ratio is detected by the specific-ratio detection circuit 16. Accordingly, regarding a QR code, the determination as to the existence of a positioning-symbol-related specific pattern is implemented by referring to the digital ratio detection data.

Detection of the ratio in length among the bright and dark portions which is equal to the predetermined ratio means detection of a positioning symbol ("A", "C", or "D") in the QR code.

As shown in FIG. 4, the QR code has linear timing cell arrays "E" and "F" which extend among the positioning symbols "A", "C", and "D". Each of the linear timing cell arrays "E" and "F" has a line of the alternation of white cells and black cells. A second step in the QR-code reading process detects the linear timing cell arrays "E" and "F". Subsequently, an image processing step detects the positions of the centers of the positioning symbols "A", "C", and "D", and the positions of the centers of the cells composing the linear timing cell arrays "E" and "F". Thereafter, the detected positions of the centers are used in calculating the positions of the centers of other cells constituting data cells. A decoding process is executed in response to the calculated positions of the centers of the data cells.

Figure 5:
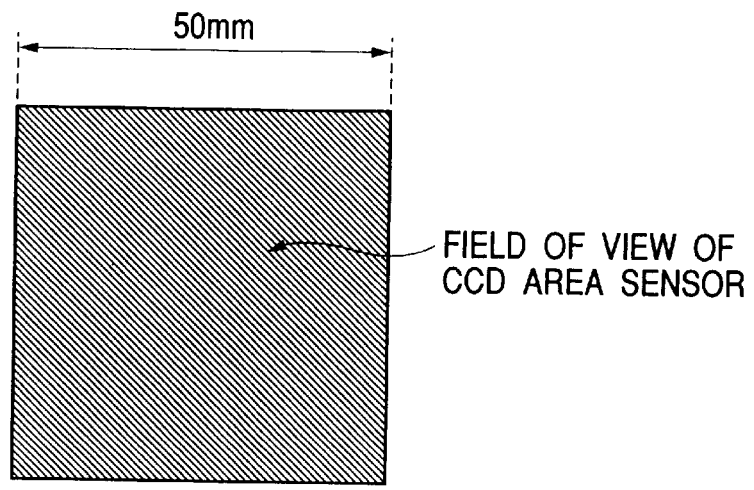
FIG. 5 is a plan illustration of the field of the view of a CCD area sensor in FIGS. 2 and 3.

As shown in FIG. 2, the optical information reading unit 10 has lower surfaces formed with an opening 10a. Return light coming from the upper surface of an article 71 can enter an interior of the optical information reading unit 10 via the opening 10a. As shown in FIG. 5, the field of the view of the CCD area sensor 13 corresponds to a square region of 50 mm by 50 mm on the upper surface of an article 71. As shown in FIG. 1, two QR codes are printed on the upper surface of each article 71 carried by the belt conveyor 70. The two QR codes are arranged and spaced at a given interval along the direction of travel of the belt conveyor 70. As shown in FIG. 2, the optical information reading unit 10 contains a mirror 10b and a lens 10c. Return light propagates from the upper surface of the article 71 to the mirror 10b via the opening 10a. The return light is reflected by the mirror 10b toward the lens 10c, and then passes through the lens 10c. The return light is focused on the CCD area sensor 13 by the lens 10c. When the QR code on the upper surface of the article 71 is in the field of the view of the CCD area sensor 13, an image of the QR code is formed on the CCD area sensor 13.

Figure 6:
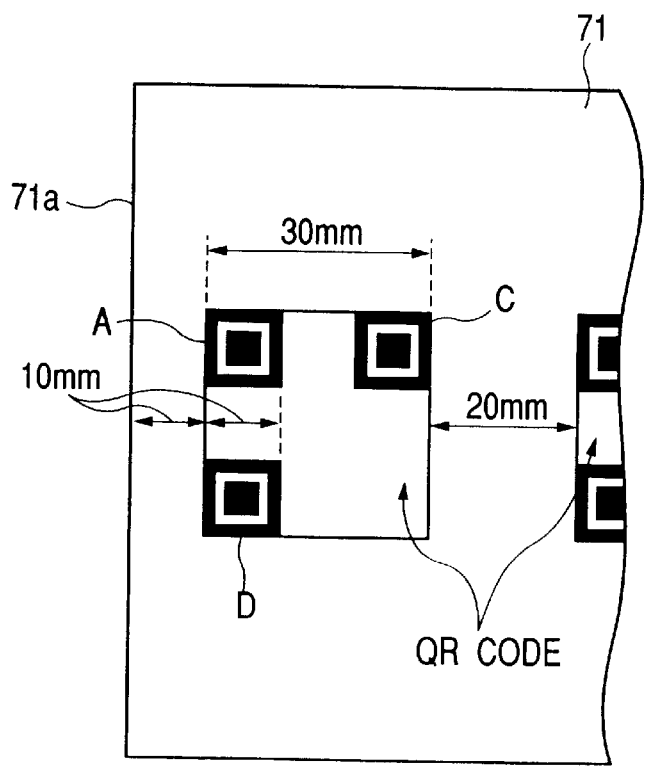
FIG. 6 is a top view of a portion of an article with QR codes.

As shown in FIG. 6, each of two QR codes on the upper surface of an article 71 extends over a square region of 30 mm by 30 mm.

The upper surface of each article 71 is square or rectangular. Each article 71 on the belt conveyor 70 is oriented so that two opposite sides of the article 71 will be perpendicular to the direction of travel of the belt conveyor 70. Each QR code on the upper surface of an article 71 is oriented so that two opposite sides of the QR code will be parallel to two opposite sides of the article 71. Two QR codes on the upper surface of an article 71 are aligned along the direction of travel of the belt conveyor 70. As viewed in the direction of travel of the belt conveyor 70, the front side of a first QR code is rearward distant from the front end surface 71a of the article 71 by 10 mm. The front side of a second QR code is rearward distant from the rear side of the first QR code by 20 mm.

Each of QR codes on the upper surfaces of articles 71 carried by the belt conveyor 70 is oriented so that two opposite sides of the QR code will be parallel to two opposite sides of the square of the view of the CCD area sensor 13. Two opposite sides of the square of the view of the CCD area sensor 13 are perpendicular to the direction of travel of the belt conveyor 70.

With reference to FIG. 2, the side (the edge) of the square of the view of the CCD area sensor 13 which is perpendicular to the direction of travel of the belt conveyor 70 and which is remoter from the predetermined position "α" extends at a position "β". When the front end surface 71a of an article 71 on the belt conveyor 70 reaches the position "β", a first QR code on the upper surface of the article 70 is centered at the field of the view of the CCD area sensor 13. The position "β" is distant from the position "α" by 90 mm. In the case where the front end surface 71a of the article 71 advances from the position "β" for 50 mm, a second QR code on the upper surface of the article 70 is centered at the field of the view of the CCD area sensor 13. Specifically, when the front end surface 71a of the article 71 reaches a position "γ", the second QR code is centered at the field of the view of the CCD area sensor 13. The position "γ" is distant from the position "α" by 140 mm.

The two-dimensional-code reading apparatus 1 features a reading process repetitively executed by the control circuit 11 within the optical information reading unit 10. The reading process includes a step of detecting whether or not the front end surface 71a of an article 71 reaches the position "α" on the basis of the output signal of the article detection unit 20. The reading process further includes a step of determining whether or not a first time interval has elapsed since the moment at which the front end surface 71a of the article 71 reaches the position "α". This determination is to detect that the front end surface 71a of the article 71 reaches the position "β". A first image is captured or inputted via the CCD area sensor 13 when it is detected that the front end surface 71a of the article 71 reaches the position "β". In addition, the reading process includes a step of determining whether or not a second time interval has elapsed since the moment at which the front end surface 71a of the article 71 reaches the position "α". This determination is to detect that the front end surface 71a of the article 71 reaches the position "γ". A second image is captured or inputted via the CCD area sensor 13 when it is detected that the front end surface 71a of the article 71 reaches the position "γ". During the reading process, a determination is made as to whether the first and second time intervals are proper or improper on the basis of the first and second captured images. In the case where the first and second time intervals are determined to be improper, the first and second time intervals are corrected.

The correction-resultant first and second time intervals will be used for reading QR codes on next and later articles 71.

Figure 7:
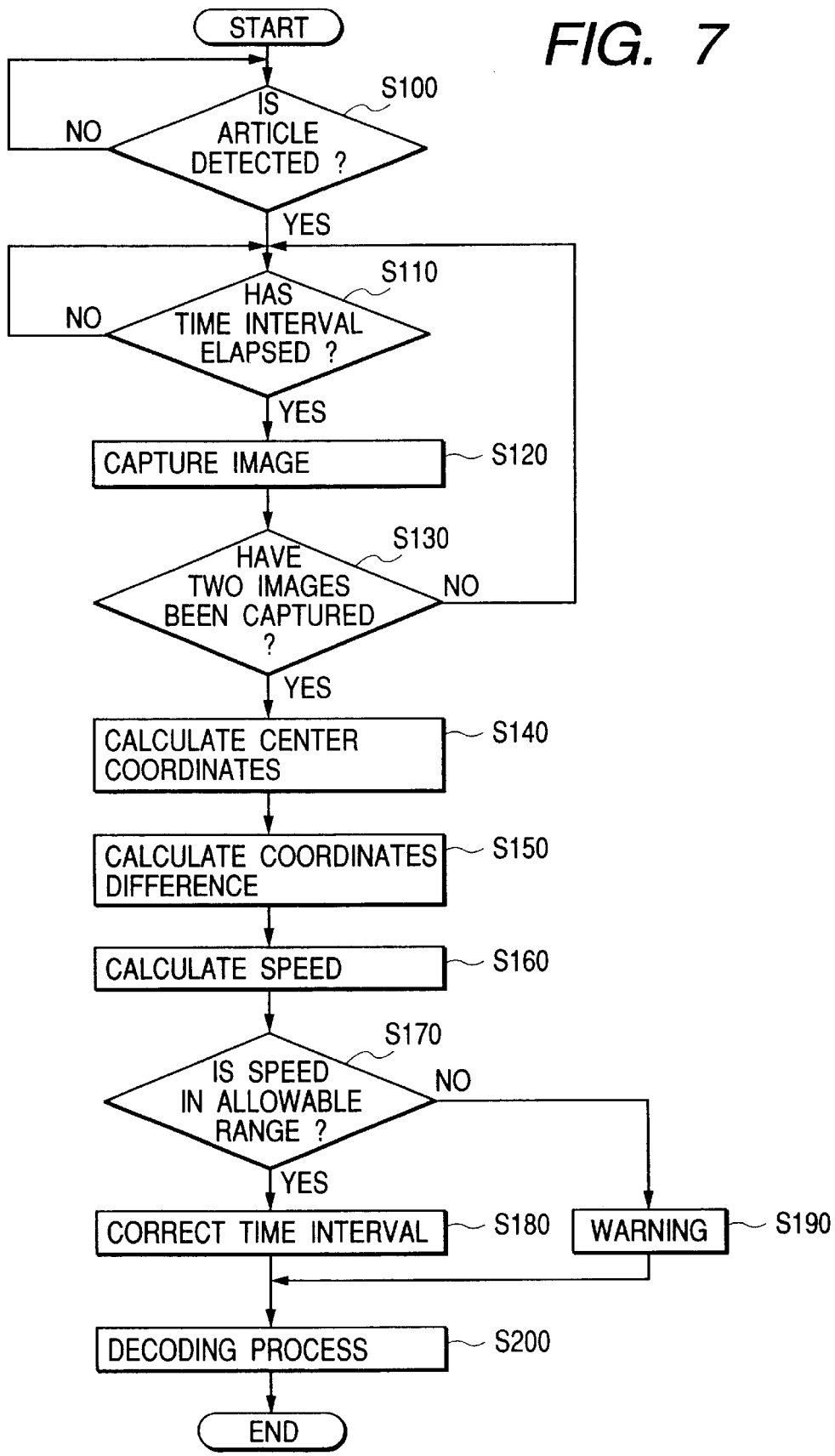
FIG. 7 is a flowchart of a segment of a program for a control circuit in FIG. 3.

As previously mentioned, the control circuit 11 operates in accordance with a program. FIG. 7 is a flowchart of a segment of the program which relates to the reading process. The program segment in FIG. 7 is iteratively executed. Specifically, the program segment in FIG. 7 is executed for each article 71.

As shown in FIG. 7, a first step S100 of the program segment determines whether or not the front end surface 71a of an article 71 reaches the position "α" on the basis of the output signal of the article detection unit 20. When the step S100 determines that the front end surface 71a of an article 71 reaches the position "α", the program advances from the step S100 to a step S110. Otherwise, the step S100 is repeated.

The step S110 determines whether or not one of first and second time intervals has elapsed since the moment at which the front end surface 71a of the article 71 reaches the position "α". As will be made clear later, the step S110 is repetitively executed. Until a first image is captured, the step S110 implements the determination related to the first time interval. After a first image is captured, the step S110 implements the determination related to the second time interval.

Initial values of the first and second time intervals are set as follows. In the case where the speed of travel of the belt conveyor 70 is set to 600 mm/sec, the time interval taken for the front end surface 71a of an article 71 to move from the position "α" to the position "β" is equal to 150 msec (=90/600 sec). An initial value of the first time interval is set to 150 msec. The time interval taken for the front end surface 71a of an article 71 to move from the position "α" to the position "γ" is equal to 233 msec (=140/600 sec). An initial value of the second time interval is set to 233 msec. As will be made clear later, the first and second time intervals can be varied from the initial values.

The step S110 determines whether or not the first time interval has elapsed since the moment at which the front end surface 71a of the article 71 reaches the position "α". When the step S110 determines that the first time interval has elapsed, the program advances from the step S110 to a step S120. Otherwise, the step S110 is repeated.

The step S120 captures or inputs a 1-frame image (a first image). Specifically, the step S120 activates the illumination LED's 12, the CCD area sensor 13, the amplifier circuit 14, the binarizing circuit 15, the specific-ratio detection circuit 16, the sync pulse generation circuit 17, and the memory 19 to generate digital image data and digital ratio detection data which correspond to a 1-frame image, and to store the digital image data and the digital ratio detection data into the memory 19.

A step S130 following the step S120 determines whether or not two images (a predetermined number of images) have been captured. When the step S130 determines that two images have been captured, the program advances from the step S130 to a step S140. Otherwise, the program returns from the step S130 to the step S110.

In this case, the step S110 determines whether or not the second time interval has elapsed since the moment at which the front end surface 71a of the article 71 reaches the position "α".

When the step S110 determines that the second time interval has elapsed, the program advances from the step S110 to the step S120. Otherwise, the step S110 is repeated. The step S120 captures or inputs a 1-frame image (a second image). After the step S120, the program advances to the step S130. In this case, the step S130 determines that two images have been captured, and the program advances from the step S130 to the step S140.

The step S140 accesses the digital image data and the digital ratio detection data in the memory 19. For each of the first and second captured images related to the digital image data and the digital ratio detection data in the memory 19, the step S140 calculates the coordinates "X" of the center of the left upper positioning symbol "A" in a QR code.

Figure 8:
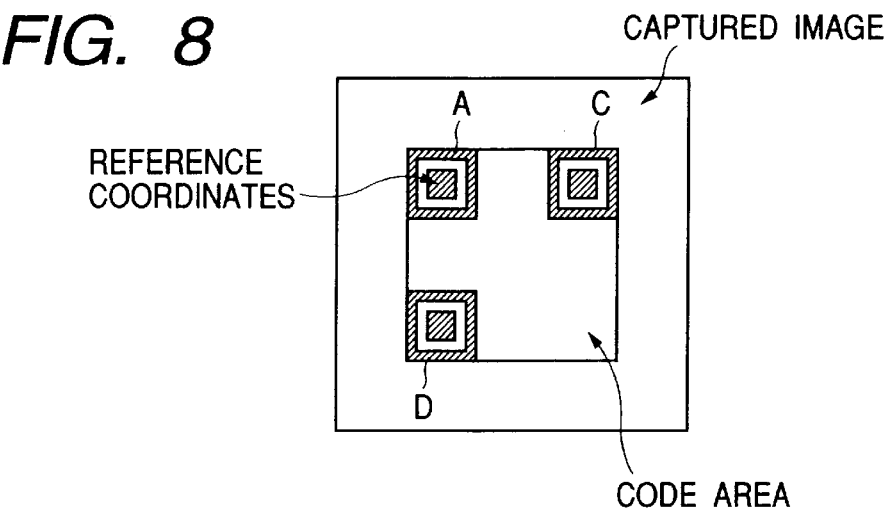
FIG. 8 is a plan view of a first exemplary captured image.

FIG. 8 shows a correctly captured image at which an image of a QR code is centered. The correctly captured image in FIG. 8 contains a complete image of the QR code.

Figure 9:
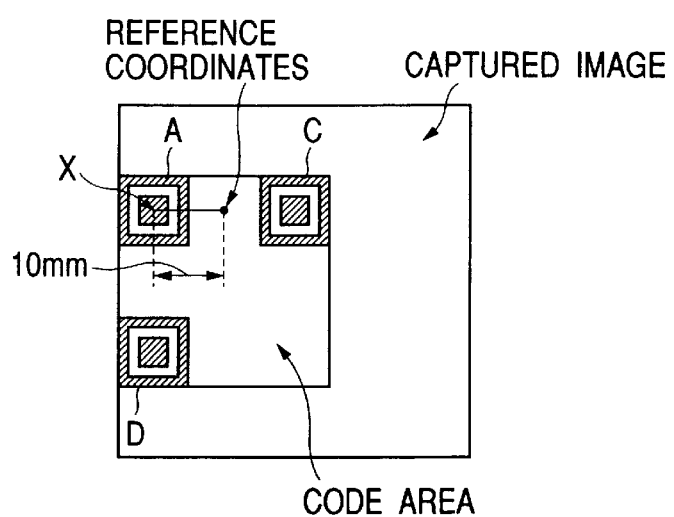
FIG. 9 is a plan view of a second exemplary captured image.

Thus, the correctly captured image in FIG. 8 has all of the three positioning symbols "A", "C", and "D" in the QR code. FIG. 9 shows an offset captured image in which the center of an image of a QR code is leftwardly separated from the captured-image center. The offset captured image in FIG. 9 contains a complete image of the QR code. Thus, the offset captured image in FIG. 9 has all of the three positioning symbols "A", "C", and "D" in the QR code.

In the case of each of the captured images of FIGS. 8 and 9, the step S140 detects three positioning symbols "A", "C", and "D".

Then, the step S140 calculates the coordinates (the position) "X" of the center of the left upper positioning symbol "A" on the basis of the arrangement of the detected positioning symbols "A", "C", and "D".

Figure 10:
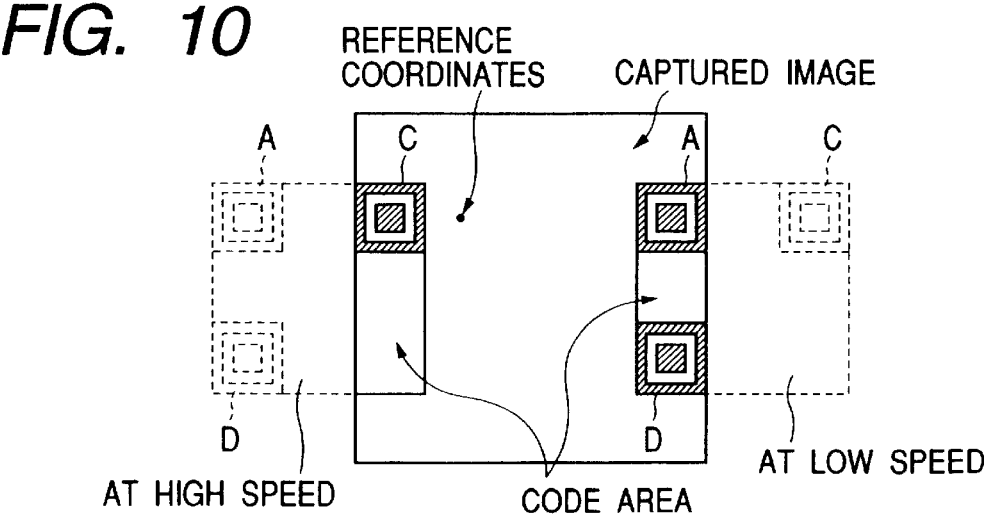
FIG. 10 is a plan view of a third exemplary captured image.

FIG. 10 shows an offset captured image which contains only a portion of an image of a QR code. The offset captured image in FIG. should be construed as containing either only a right portion of a QR code or only a left portion of a QR code. The offset captured image with only the right portion of the QR code occurs at a relatively high speed of travel of the belt conveyor 70. On the other hand, the offset captured image with only the left portion of the QR code occurs at a relatively low speed of travel of the belt conveyor 70. In FIG. 10, regarding the left QR code, only the right upper positioning symbol "C" is in the captured image. Regarding the right QR code, only the left upper positioning symbol "A" and the left lower positioning symbol "D" are in the captured image.

In the case of the left QR code of FIG. 10, the step S140 detects only one positioning symbol. According to the arrangement of three positioning symbols "A", "C", and "D" in one QR code, the step S140 finds the detected positioning symbol to be the right upper positioning symbol "C". Then, the step S140 calculates the coordinates (the position) "X" of the center of the left upper positioning symbol "A" on the basis of the coordinates of the center of the detected right upper positioning symbol "C".

In the case of the right QR code of FIG. 10, the step S140 detects only two positioning symbol. According to the arrangement of three positioning symbols "A", "C", and "D" in one QR code, the step S140 finds the detected positioning symbols to be the left upper positioning symbol "A" and the left lower positioning symbol "D". Then, the step S140 calculates the coordinates (the position) "X" of the center of the detected left upper positioning symbol "A".

For each of the first and second captured images, a step S150 following the step S140 computes the difference between the calculated coordinates "X" and predetermined reference coordinates along the direction of travel of the belt conveyor 70. The reference coordinates agree with the center of the left upper positioning symbol "A" in a QR code which is centered at a correctly captured image (see FIG. 8). In the case of the captured image of FIG. 9, the computed difference is equal to 10 mm in an advanced side.

For each of the first and second captured images, a step S160 subsequent to the step S150 calculates the current speed of carry of the present article 71, that is, the current speed of travel of the belt conveyor 70 on the basis of the computed difference. In the case of the captured image of FIG. 9, since the computed difference is equal to 10 mm in the advanced side, it is decided that the present article 71 travels 100 mm (90 mm plus 10 mm) for 150 msec. Thus, the calculated current speed of carry of the present article 71 is equal to 667 mm/sec (approximately $^{100}/_{0.15}$ mm/sec). The step S160 computes the mean of the calculated current speed of carry of the present article 71 for the first captured image and the calculated current speed of carry of the present article 71 for the second captured image.

A step S170 following the step S160 determines whether or not the computed mean current speed of carry of the present article 71 is within a predetermined allowable range. The allowable range is chosen to prevent the speed of travel of the belt conveyor 70 from excessively rising or dropping. An excessive rise in the conveyor speed would cause an improper amount of forward reading light and an improper light exposure time related to the CCD area sensor 13. An excessive drop in the conveyor speed would cause a reduction in the efficiency of reading QR codes. When the step S170 determines that the computed mean current speed of carry of the present article 71 is within the allowable range, the program advances from the step S170 to a step S180. Otherwise, the program advances from the step S170 to a step S190.

The step S180 corrects the first and second time intervals in response to the computed mean current speed of carry of the present article 71. For example, in the case where the computed mean current speed of carry of the present article 71 is equal to 667 mm/sec, the first time interval is corrected to 135 msec ($^{90}/_{667}$ sec) while the second time interval is corrected to 210 ($^{140}/_{667}$ sec). The correction-resultant first and second time intervals will be used in later execution of the step S110. After the step S180, the program advances to a step S200.

The step S190 implements a warning process. Specifically, the step S190 activates a buzzer (not shown) in the optical information reading unit 10 to inform a user of a warning. After the step S190, the program advances to the step S200.

The step S200 implements a decoding process on the QR codes represented by the digital image data in the memory 19. Thus, the step S200 recovers information indicated by the QR codes. After the step S200, the current execution cycle of the program segment ends.

The two-dimensional-code reading apparatus 1 provides effects and advantages as follows. In the apparatus 1, the article detection unit 20 detects a moment at which an article 71 reaches the predetermined position "α". When the first or second time interval has elapsed since that moment, the optical information reading unit 10 captures an image (the steps S110 and S120).

Calculation is given of the coordinates of the center of the left upper positioning symbol "A" in a QR code in the captured image (the step S140). The speed of carry of the present article 71 is computed on the basis of the calculated center coordinates (the steps S150 and S160). The first and second time intervals are corrected on the basis of the computed carry speed (the step S180). Thus, it is unnecessary to provide an external device for detecting the speed of travel of the belt conveyor 70 (the speed of carry of articles 71).

Accordingly, the two-dimensional-code reading apparatus 1 is simple in structure.

In the case of a QR code, it is easy to calculate the coordinates of the center of the left upper positioning symbol "A" (the step S140). In the case where at least one positioning symbol exists in a captured image, the first and second time intervals can be corrected. Accordingly, the two-dimensional-code reading apparatus 1 is able to follow a relatively great variation in the speed of travel of the belt conveyor 70.

The two-dimensional-code reading apparatus 1 uses the first and second time intervals. When the first time interval has elapsed since the given moment, a first image is captured for a first QR code on an article 71. When the second time interval has elapsed since the given moment, a second image is captured for a second QR code on the same article 71 (the steps S110, S120, and S130). The coordinates of the center of the left upper positioning symbol "A" are calculated for each of the first and second captured images (the step S140). The speed of carry of the article 71 is computed on the basis of the calculated center coordinates for each of the first and second captured images (the steps S150 and S160). Computation is made as to the mean of the calculated carry speed for the first captured image and the calculated carry speed for the second captured image (the step S160). The mean calculated carry speed is relatively accurate. Therefore, the first and second time intervals can be accurately corrected, and the image capture timings can be suitably set.

An excessive rise in the conveyor speed would cause an improper amount of forward reading light and an improper light exposure time related to the CCD area sensor 13. An excessive drop in the conveyor speed would cause a reduction in the efficiency of reading QR codes. In the two-dimensional-code reading apparatus 1, a determination is given of whether or not the computed mean current speed of carry of the present article 71 is within the allowable range (the step S170). When it is determined that the computed mean current speed of carry of the present article 71 is not within the allowable range, a user is warned of an excessive rise or an excessive drop in the conveyor speed (the step S190).

The article detection unit 20 and the control circuit 11 in the optical information reading unit 10 correspond to detecting means. The CCD area sensor 13 in the optical information reading unit 10 corresponds to image capturing means. The control circuit 11 in the optical information reading unit 10 corresponds to positional information calculating means, capture timing correcting means, and decoding means.

The process by the step S100 in FIG. 7 corresponds to the process by the detecting means. The processes by the steps S110, S120, and S130 correspond to the process by the image capturing means. The process by the step S140 corresponds to the process by the positional information calculating means. The processes by the steps S150, S160, and S180 correspond to the process by the capture timing correcting means. The process by the step S200 corresponds to the process by the decoding means.

Second Embodiment

A second embodiment of this invention is similar to the first embodiment thereof except for design changes mentioned hereinafter. In the second embodiment of this invention, the first and second time intervals are fixed. The second embodiment of this invention includes a device for changing the speed of travel of the belt conveyor 70. The speed changing device is controlled in response to the computed mean carry speed. Thus, the computed mean carry speed is used in controlling the speed of travel of the belt conveyor 70 rather than the image capture timings (the first and second time intervals).

Third Embodiment

A third embodiment of this invention is similar to the first embodiment thereof except for design changes mentioned hereinafter. The third embodiment of this invention includes a device for changing the speed of travel of the belt conveyor 70. The third embodiment of this invention replaces the step S190 by a step of controlling the speed changing device in response to the computed mean carry speed to change the speed of travel of the belt conveyor 70.

Fourth Embodiment

A fourth embodiment of this invention is similar to the first embodiment thereof except for design changes mentioned hereinafter. In the fourth embodiment of this invention, at least three QR codes are provided on the upper surface of each article 71 carried by the belt conveyor 70. At least three images are successively captured for the respective QR codes on one article 71. The coordinates of the center of the left upper positioning symbol are calculated for each of the captured images. A mean speed of carry of the article 71 is computed on the basis of the calculated coordinates of the centers of the left upper positioning symbols.

Fifth Embodiment

Figure 11:
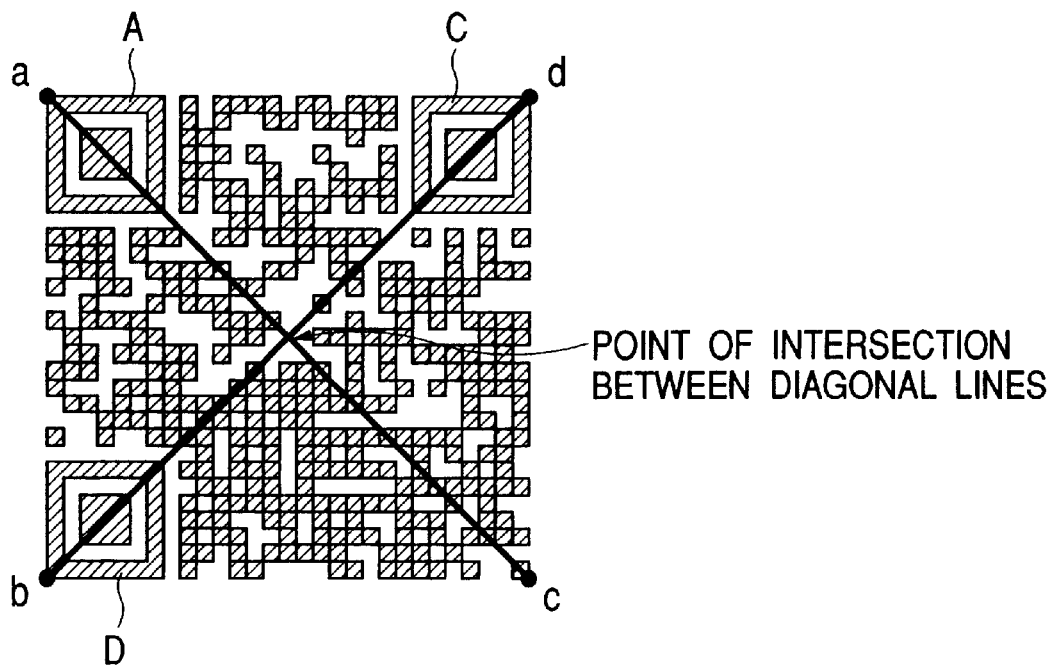
FIG. 11 is a plan view of an example of a QR code.

A fifth embodiment of this invention is similar to the first embodiment thereof except for design changes mentioned hereinafter. With reference to FIG. 11, in the fifth embodiment of this invention, the coordinates of the corners "a", "b", and "d" of a QR code area are calculated from the coordinates of the centers of the positioning symbols "A", "C", and "D". The coordinates of the corner "c" of the QR code area are calculated from the coordinates of the corners "a", "b", and "d". The diagonal line connecting the opposite corners "a" and "c" is determined. In addition, the diagonal line connecting the opposite corners "b" and "d" is determined. The coordinates of the point of intersection between the two diagonal lines are computed as the coordinates of the center of the QR code area. The fifth embodiment of this invention uses the calculated coordinates of the center of the QR code area instead of the calculated coordinates of the center of the left upper positioning symbol "A" in computing the current speed of carry of a related article 71.

Sixth Embodiment

A sixth embodiment of this invention is similar to the first embodiment thereof except for design changes mentioned hereinafter. The sixth embodiment of this invention uses a bar code or a two-dimensional code different from a QR code. The sixth embodiment of this invention uses a positional-information calculating algorithm which is suited to the bar code or the two-dimensional code.

Seventh Embodiment

A seventh embodiment of this invention is similar to the first embodiment thereof except for design changes mentioned hereinafter. In the seventh embodiment of this invention, the field of the view of the CCD area sensor 13 has a rectangular shape different from a square shape. In addition, the optical information reading unit 10 can be rotated between first and second predetermined positions about an axis perpendicular to the upper surface of the belt conveyor 70. The first and second predetermined positions are spaced by an angular interval of 90 degrees. The optical information reading unit 10 is fixed to either the first predetermined position or the second predetermined position during its operation.

Preferably, the first and second predetermined positions are chosen to satisfy the following conditions. When the optical information reading unit 10 is in the first predetermined position, longer sides of the field of the view of the CCD area sensor 13 are parallel to the direction of travel of the belt conveyor 70 (the direction of carry of articles 71).

When the optical information reading unit 10 is in the second predetermined position, longer sides of the field of the view of the CCD area sensor 13 are perpendicular to the direction of travel of the belt conveyor 70 (the direction of carry of articles 71).

The position of the article detection unit 20 relative to the optical information reading unit 10 can be changed. Regardless of whether the optical information reading unit 10 is in the first predetermined position or the second predetermined position, the article detection unit 20 is located at a position upstream of the optical information reading unit 10 with respect to the direction of travel of the belt conveyor 70.

An additional step is provided between the steps S140 and S150 in FIG. 7. For each of first and second captured images, the n additional step detects the direction of carry of an article 71 relative to the field of the view of the CCD area sensor 13 on the basis of a QR code image or images. The detected carry direction is used in the difference calculation by the step S150.

Eighth Embodiment

Figure 12:
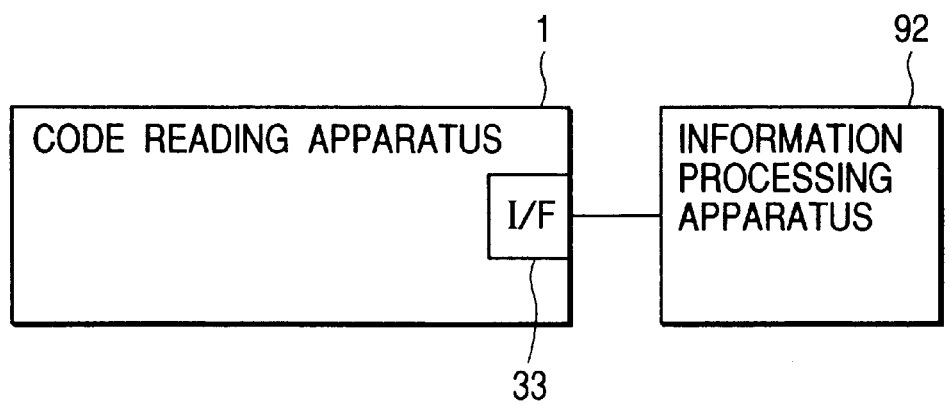
FIG. 12 is a block diagram of a system according to an eighth embodiment of this invention.

FIG. 12 shows a system according to an eighth embodiment of this invention. The system of FIG. 12 includes a two-dimensional-code reading apparatus 1 and an information processing apparatus 92. The two-dimensional-code reading apparatus 1 is basically similar in structure to that in the first embodiment of this invention.

The communication I/F circuit 33 in the two-dimensional-code reading apparatus 1 is connected to the information processing apparatus 92. The information processing apparatus 92 includes a computer system such as a personal computer.

When the control circuit 11 (see FIG. 3) in the two-dimensional-code reading apparatus 1 has completed the process at the step S130 (see FIG. 7), digital image data and digital ratio detection data are transmitted from the memory 19 (see FIG. 3) to the information processing apparatus 92 via the communication I/F circuit 33. The information processing apparatus 92 subjects the digital image data and digital ratio detection data to processes corresponding to the processes by the steps S140–S190 in FIG. 7. Thus, the information processing apparatus 92 generates corrective information, that is, information of correcting the first and second time intervals used in the step S110 of FIG. 7. The corrective information contains a correcting command. The information processing apparatus 92 transmits the corrective information to the two-dimensional-code reading apparatus 1. In the two-dimensional-code reading apparatus 1, the control circuit 11 (see FIG. 3) corrects the first and second time intervals in accordance with the corrective information. Thereafter, the control circuit 11 executes the decoding process at the step S200 (see FIG. 7).

The two-dimensional-code reading apparatus 1 in the eighth embodiment of this invention can be simpler in structure than that in the first embodiment of this invention.

In the case where there are a plurality of two-dimensional-code reading apparatuses 1, the information processing apparatus 92 is sequentially connected to the two-dimensional-code reading apparatuses 1 and image capture timings are set or corrected for each of the two-dimensional-code reading apparatuses 1. Thus, only one information processing apparatus 92 suffices for plural two-dimensional-code reading apparatuses 1.

What is claimed is:

1. An information-code-image capturing apparatus for emitting light toward an article moving along a carry path, and receiving reflected light and capturing an image of an information code on the article, comprising:
    detecting means for detecting that the article reaches a predetermined position in the carry path;
    image capturing means for capturing the image based on the reflected light when a time interval has elapsed since a moment at which the detecting means detects that the article reaches the predetermined position;
    positional information calculating means for calculating positional information based on the image captured by the image capturing means, the positional information enabling an area of the information code to be determined in the captured image; and
    capture timing correcting means for correcting the time interval based on the positional information calculated by the positional information calculating means.

2. The information-code-image capturing apparatus according to claim 1, wherein the positional information calculating means comprises means for calculating the positional information based on a positioning symbol in the information code.

3. The information-code-image capturing apparatus according to claim 2, wherein the positional information calculating means comprises means for calculating a position of a center of the information code as the positional information based on the positioning symbol in the information code.

4. The information-code-image capturing apparatus according to claim 2, wherein the information code comprises a quick response code, and the positional information calculating means comprises means for calculating a position of a center of a positioning symbol in the quick response code as the positional information.

5. An information-code-image capturing apparatus for emitting light toward an article moving along a carry path, and receiving reflected light and capturing an image of an information code on the article, comprising:
    detecting means for detecting that the article reaches a predetermined position in the carry path;
    image capturing means for capturing the image based on the reflected light when a time interval has elapsed since a moment at which the detecting means detects that the article reaches the predetermined position;
    positional information calculating means for calculating positional information based on the image captured by the image capturing means, the positional information enabling an area of the information code to be determined in the captured image; and
    capture timing correcting means for correcting the time interval based on the positional information calculated by the positional information calculating means, wherein
        the time interval comprises a plurality of different sub time intervals;
        the image capturing means comprises means for capturing an image when each of the sub time intervals has elapsed since the moment at which the detecting means detects that the article reaches the predetermined position;
        the positional information calculating means comprises means for calculating positional information for each of the images captured by the image capturing means; and
        the capture timing correcting means comprises means for correcting each of the sub time intervals based on the positional information calculated by the positional information calculating means.

6. The information-code-image capturing apparatus according to claim 5, wherein the capture timing correcting means comprises means for detecting a direction of carry of the article based on the calculated positional information for each of the captured images, and means for correcting each of the sub time intervals in response to the detected direction of carry of the article.

7. The information-code capturing apparatus according to claim 5 further comprising:

decoding means for executing a decoding process with respect to the information code in the image captured by the information-code-image capturing apparatus to read information represented by the information code.

8. A system for setting an image capture timing, comprising:

an optical information reading apparatus for emitting light toward an article moving along a carry path, and receiving reflected light and capturing an image of an information code on the article; and an information processing apparatus being separate from the optical information reading apparatus and being able to implement data communications with the optical information reading apparatus;

wherein the optical information reading apparatus comprises 1) detecting means for detecting that the article reaches a predetermined position in the carry path; 2) image capturing means for capturing the image on the basis of the reflected light when a time interval has elapsed since a moment at which the detecting means detects that the article reaches the predetermined position; 3) transmitting means for transmitting the image captured by the image capturing means to the information processing apparatus; and 4) capture timing correcting means for receiving a correcting command from the information processing apparatus, and for correcting the time interval in response to the correcting command; and wherein the information processing apparatus comprises 1) positional information calculating means for calculating positional information based on the image transmitted from the optical information reading apparatus; and 2) command generating means for generating the correcting command on the basis of the positional information calculated by the positional information calculating means, and for transmitting the correcting command to the optical information reading apparatus.

9. An adaptive apparatus for capturing at least portions of images of successively carried articles having information-representing codes at equal positions of the articles, comprising:

first means for detecting whether or not an article reaches a predetermined position;

a fixed image sensor;

second means for capturing at least a portion of an image of the article via the image sensor when a variable time interval has elapsed since a moment at which the first means detects that the article reaches the predetermined position;

third means for detecting a position of an information-representing code in the image captured by the second means; and forth means for varying the time interval in responds to the position detected by the third means.

* * * * *